United States Patent [19]

Takahashi et al.

[11] Patent Number: 5,356,255
[45] Date of Patent: Oct. 18, 1994

[54] NUT AND PANEL ASSEMBLY AND METHOD OF FORMING SAME

[75] Inventors: Takao Takahashi, Machida; Hiroshi Takehara, Hachioji, both of Japan

[73] Assignee: Multifastener Corporation, Detroit, Mich.

[21] Appl. No.: 29,218

[22] Filed: Mar. 10, 1993

[30] Foreign Application Priority Data

Mar. 10, 1992 [JP] Japan .................. 4-86263

[51] Int. Cl.$^5$ .................. F16B 37/14; B05D 3/00
[52] U.S. Cl. .................. 411/431; 411/180; 411/377; 427/300; 29/432.2
[58] Field of Search .................. 411/3, 5, 377, 429, 411/431, 179, 180; 427/300, 409, 421, 435; 29/432.2, 525.1, 525.2

[56] References Cited

U.S. PATENT DOCUMENTS

| 4,411,934 | 10/1983 | Steinhagen | 427/300 X |
|---|---|---|---|
| 4,472,098 | 9/1984 | Kiefer | 411/429 X |
| 4,556,350 | 12/1985 | Bernhardt et al. | 411/3 X |
| 4,708,550 | 11/1987 | Hamilton | 411/3 |
| 4,875,817 | 10/1989 | Suzumura et al. | 411/429 X |
| 4,893,976 | 1/1990 | Milliser et al. | 411/180 |
| 4,900,206 | 2/1990 | Kazino et al. | 411/431 X |
| 4,940,375 | 7/1990 | Marvell et al. | 29/432.2 X |
| 5,193,716 | 3/1993 | Horiki et al. | 427/300 X |

FOREIGN PATENT DOCUMENTS

| 45449 | 10/1982 | Japan . |
|---|---|---|
| 175816 | 9/1985 | Japan . |
| 6375 | 1/1987 | Japan . |
| 6521 | 1/1987 | Japan . |
| 19411 | 1/1988 | Japan . |
| 23015 | 1/1988 | Japan . |
| 23016 | 1/1988 | Japan . |
| 34313 | 2/1988 | Japan . |
| 15851 | 4/1991 | Japan . |

*Primary Examiner*—Neill R. Wilson
*Attorney, Agent, or Firm*—Howard & Howard

[57] ABSTRACT

A nut and panel assembly useful for pierce, clinch and weld nuts used in automotive applications, wherein the nut bore must be masked or blocked during paint application, including electrodeposition coatings. A generally cylindrical polymeric plug or blocking member is press fitted into the nut bore preferably prior to attaching the nut to the metal panel. Following installation of the nut in the panel, the plug masks the nut bore during the later coating operation. The disclosed plug or blocking member includes an axial configured cavity and the plug may then be removed following coating by threading a bolt having an end protuberance configured to be received in the plug axial cavity into the nut bore. The plug is then retained on the bolt protuberance following removal from the threaded bore.

25 Claims, 2 Drawing Sheets

NUT AND PANEL ASSEMBLY AND METHOD OF FORMING SAME

BACKGROUND OF INVENTION

The present invention relates to nut and panel assemblies, particularly nut and panel assemblies used in mass production applications, such as automotive applications wherein the nut is permanently attached to the panel and the assembly is later painted or coated. In such applications, the screw hole is masked to prevent entry of the coating material. The present application discloses a unique masking plug which prevents entry of the coating material and serves as a seal if the nut is not filled with a bolt during later assembly.

In order to mount various accessories and auxiliary equipment in automotive applications, various types of nuts are attached to vehicle parts made of sheet metal, such as the side sil, bumper reinforcement, dashboard, trunk lid, hood, pillar, door, cross member, floor panel and the body components of the vehicle. Typically, weld nuts, clinch nuts or pierce nuts are used. As is generally known, weld nuts are attached to the vehicle part by resistance welding or projection welding and pierce nuts are attached to the vehicle part by an installation head and die button which punches the pilot portion of the pierce nut through the metal panel and then deforms the panel metal and sometimes the nut to mechanically interlock the nut and the panel. Clinch nuts are similarly applied, except the nut is attached in a preformed panel opening.

Vehicle parts with nuts attached are fed to the coating process independently or coated after attachment to the vehicle part. Automobile manufactures generally require a high quality film coating by the time coat-three bake method, including undercoating (primer), middle coating and top coating, which are all applied to the automobile part with the nut attached. Normally, the undercoating is applied by the electrodeposition coating method, preferably by the cationic electrodeposition coating method and electrodeposition of the coating material is completed only after the part with the nut attached has been degreased. Then, the coating is baked and hardened at temperatures of 180° to 210° C. after washing and dewatering to form a uniform film coating having superior rust prevention properties. The middle coating is normally applied by the spray coating or powder coating method and the coating is baked at temperatures of 160° to 170° C. The top coating may then be applied by the spray coating method and baked at temperatures of 160° to 170° C.

A first problem experienced with preattached nuts coated as described above is that it may be difficult to insert the bolt into the screw hole of the nut, when mounting various accessories, because the coating material has infiltrated into the screw hole of the nut and affixed to the threads in each of the coating steps described. The film coating in the screw hole of the pierce, clinch or weld nut makes the operation of screwing in the outer threads of the bolt into the inner threads of the screw hole difficult, increasing the torque required to tighten the bolt.

In particular, the electrodeposition coating methods described above have great throwing (transliteration) power so that the coating material adheres even in the corners of the threads of the pierce, clinch and weld nuts during the electrodeposition coating and the film coating is hardened by baking, forming an obstacle to tightening of the bolt.

Therefore, conventionally, the bore or screw hole of the nut is masked with a masking rubber or masking tape at the coating plant. Normally, masking is accomplished by manually blocking each screw hole of each nut with masking tape or filling the screw hole with a masking rubber in a manual operation. After coating, the masking tape or masking rubber is removed similarly by manual operation. Although welding of the weld nuts and mounting of pierce and clinch nuts have become automated and the electrodeposition coating process has been automated, resulting in substantial savings and labor costs, the masking operation is still dependent upon manual labor. This is due in part to the fact that the nut is mounted to the sheet metal in differing locations for vehicles to be coated and the fact that it is impossible or difficult to automate the masking operation (including removal of masking tape or masking rubber) at the coating plant. Therefore, a very substantial number of man days are necessary for masking by manual labor and the masking cost accounts for a considerable part of the total cost of coating. Further, the undercoating, middle coating and top coating may be applied at different plants and thus the masking and removal process may be required after each coating application at each plant, such that the total masking cost substantially increases the cost of the parts.

Various solutions have been suggested for masking automobile parts with nuts during the coating operation. For example, a lid formed of a thin plate material, such as metal plate, vinyl sheet or paper, has been attached at one end of the screw hole. However, such masking means is effective with respect to spray coating only. A major portion of the screw hole is left exposed and thus this method cannot be used in the case of electrodeposition coating because the parts to be coated are immersed in the immersion coating type of the electrodeposition bath and the coating particles are electrically absorbed on the parts to be coated. The throwing power of an electrodeposition bath is great and the coating material is absorbed evenly on the exposed surfaces of the screw hole in the electrodeposition bath.

The use of a foam plug has also been suggested, wherein a foamable material is inserted into the screw hole of a weld nut and the screw hole is then filled by foaming the material with the heat of welding. In this process, the heat is indispensable for foaming the foam material and therefore this process would not be suitable for pierce and clinch nuts which are attached without generating heat, as with weld nuts. The prior art also suggests filling the threaded bore of a weld nut with a sublimation solid, such as naphthalene. A sublimation solid is not sublimated during the electrodeposition coating, but is sublimated in the heat of the drying-/baking step. According to this method, it is necessary to fill the screw hole with the sublimation solid only after welding to prevent the solid from being sublimated by the heat generated in the weld attachment of the weld nut to the metal panel. Consequently, this method is not suitable for mass production. Also, sublimation of naphthalene can be completed only once, such that the nut must be filled each time a coating is applied and baked, which would require three applications of the sublimation solid where a three coat-three bake coating method is used.

Electrodeposition coating of vehicle parts has yet to solve the above-described masking problem, although electrodeposition coatings of automobiles has been used for over fifteen years.

A second problem with the utilization of pierce, clinch and weld nuts is related to the production of many models of automobiles and trucks in small volumes. In recent years, there has been a trend for many models of automobiles to be manufactured in smaller volumes. Normally, weld, pierce and clinch nuts are mounted to sheet metal parts to conform to as many vehicle models, as possible. Thus, many nuts are left unused, depending upon the vehicle model. The unused nuts, which do not have a bolt inserted into the threaded bore, not only generate noise created by wind when the wind passes through the nut bore, but the nut bore also allows noise and foreign matter, such as mud, to enter into the car, such as when the unused nut is in the floor panel or dashboard.

In several automotive applications, the threads of the pierce nuts are coated with a fluorocarbon polymer, such that paint does not strongly adhere to the threads during subsequent coating applications. Thus, a bolt or screw can be more easily threaded into the nut. However, the nut is not sealed during subsequent coating applications and therefore coating of the threads does not solve the second problem described above. That is, unused nuts generate wind noise and allow passage of foreign matter, as described. Thus, the prior art has failed to solve the described problems associated with the use of weld and pierce nuts.

SUMMARY OF THE INVENTION

The nut and panel assembly of this invention is preferably of the type wherein the nut is permanently attached to the panel and the nut includes a threaded bore or screw hole which extends through the nut and the mating panel. A resilient non-metallic plug or blocking member is located in the bore. The plug is preferably relatively soft and generally cylindrical having a normal or free outside diameter greater than a minor or crest diameter of the nut threaded bore, such that the plug is releasably retained in the bore by the crests of the threads. The plug also preferably has an axial length which is generally equal to an axial length of the threaded bore, such that the plug substantially fully masks the threaded bore during the subsequent coating or paint applications.

Where the nut and panel assembly is later subjected to an electrodeposition coating process and heat, the plug or blocking member is preferably formed of an electrically insulating and heat resistant elastic polymer, such as silicon rubber. In the most preferred embodiment, the blocking member is slightly conical with the leading end which is first inserted into the thread bore having a slightly smaller diameter than the following end and the edges are rounded, such that the plug may be easily inserted and press fit in the thread bore. As described more fully herein, the plug is preferably press fit in the nut prior to installation of the nut in the metal panel. The plug may then be inserted in the nut bore in a mass production process prior to receipt of the nuts in the panel installation apparatus.

The problem of loose plugs or blocking members in vehicle components or on the assembly floor have been solved in the most preferred embodiment of this invention by providing a configured axial cavity in the resilient plug which opens through the following end of the plug. A bolt or screw having a configured axial protuberance on the leading end is then threaded into the threaded bore of the nut, which inserts the configured protuberance into the axial cavity of the plug, retaining the plug on the bolt after it is removed from the threaded bore. In the most preferred embodiment, the axial cavity in the plug is generally spherical having a reduced diameter opening and the protuberance on the bolt is also generally spherical, such that the protuberance will rotate in the plug cavity, but the plug is retained on the bolt protuberance following removal from the nut cavity.

The method of this invention then includes inserting and press fitting the generally cylindrical plug or blocking member in the axial threaded bore of the nut prior to installation of the nut in the panel. As described, the plug is preferably molded from an electrically insulating, heat resistant elastic polymer, such as silicon rubber. The axial spherical cavity may be molded by conventional molding techniques. The nut with the polymeric masking plug is then installed in the panel by conventional methods, depending on the type of nut. Weld nuts are generally attached to the metal panel by resistance or projecting welding, as is well known in the art. Pierce and clinch nuts are attached by driving the nut into a panel supported on a die button, which deforms the panel metal into a mechanical interlock with the nut. Piece nuts shear a slug from the panel during the installation and clinch nuts are installed in a preformed panel opening.

The nut and panel assembly may then be coated, such as by an electrodeposition or electrostatic coating process. The blocking member or plug masks the threads of the screw hole or threaded bore of the nut during the coating process, but the plug may be easily removed if desired following coating. Where the polymeric plug includes an axial cavity and the bolt has a mating protuberance, the plug is removed by threading the bolt into the nut bore, which inserts the protuberance into the plug cavity and retains the plug following removal.

The nut and panel assembly and method of this invention thus solves the problems associated with the prior art masking methods. The polymeric plugs or blocking members are preferably press fit into the threaded bores of the nuts before the nuts are installed in the metal panel. The welding of the weld nuts and installation of pierce or clinch nuts can then be executed efficiently in the same manner as in the conventional technology with an automatic nut welder or automatic pierce nut installation tooling. A blocking member or plug composed of silicon rubber has superior elasticity and heat resistance, such that it does not shrink or disappear when exposed to the heat of welding, where the nut is a weld nut, and the plug is held securely in the nut bore. When the nut has been permanently attached to the panel, the polymeric plug has already blocked the nut bore, so that it is unnecessary to mask the screw holes of the nuts when the part is subject to the electrodeposition coating process. A silicon rubber plug also has electric insulation properties, such that the plug prevents the coating particles in the electrodeposition bath from adhering to the surfaces of the threaded bore during the electrodeposition coating process. When the electrodeposition coating is completed and the film coat is baked and hardened, the coated sheet metal part may be fed to the assembly line with the plug left in the threaded bore, unaffected by the coating process.

When the polymeric masking plug is press fit in the threaded bore of the nut, the threads bite into the soft side surface of the polymeric plug, such that the plug is held in the threaded bore by friction and the plug does not fall out of the nut due to vibration. Therefore, even if the nut is left unused in the completed vehicle, the plug does not fall out of the nut threaded bore during normal travel of the vehicle and the plug prevents the infiltration of foreign particles, mud and noise and the generation of noise by the wind. When screwing the bolt into the nut during mounting of an accessory to the metal part, a plug or blocking member formed of silicon rubber has favorable lubrication properties, as well as being relatively soft. The plug is thus pushed out easily from the threaded bore by the bolt. Consequently, only a small force is necessary to push the blocking member out of the threaded bore and the bolt tightening torque need not be increased.

As described, the most preferred embodiment of the masking plug includes an axial cavity having a spherical head and a narrow or reduced inlet on the bolt side of the blocking member. A protrusion on the bolt with a partially spherical shape which conforms to the spherical head portion of the cavity is formed at the tip of the bolt. With this structure, the protrusion on the bolt and the cavity in the blocking member engage as the bolt is screwed into the threaded bore of the nut and the plug remains adhered at the tip of the bolt when the plug is pushed out of the screw hole by the bolt. Even if by chance the plug is separated from the bolt and falls into a space in the vehicle due to vibration, etc., a plug formed from a soft silicon rubber will not generate abnormal noise or cause rust.

Other advantages and meritorious features will be more fully understood from the following description of the preferred embodiment of this invention, the appended claims and the drawings, a brief description of which follows.

DESCRIPTION OF THE PREFERRED EMBODIMENT

A preferred embodiment of the nut and panel assembly and method of this invention will now be described in connection with a pierce nut of the type manufactured and sold by the Assignee of the present application. It will be understood, however, that the nut of the nut and panel assembly of this invention may be a weld nut or a clinch nut or another type of nut requiring masking of the nut bore during subsequent operations or during use. Thus, the nut and panel assembly of this invention is not limited to pierce nuts, particularly pierce nuts of the type disclosed herein. FIGS. 1 to 5, however, show application examples which apply the invention to sheet metal parts for vehicles with pierce nuts.

Figure 1:
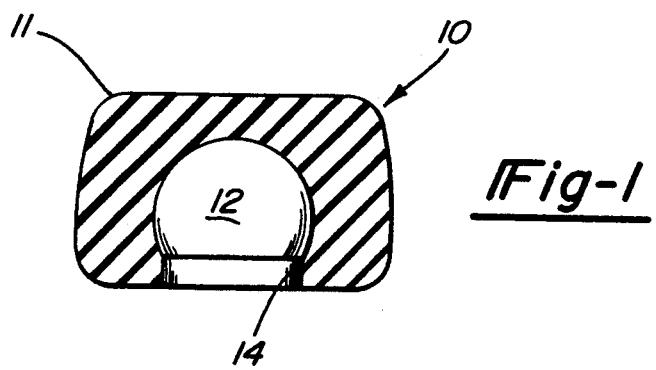
FIG. 1 is an enlarged cross-sectional view in the axial direction of a preferred embodiment of the polymeric plug or blocking member of this invention.

Referring to FIG. 1, the polymeric plug or blocking member 10 is formed by molding silicon rubber material having an external shape which is generally cylindrical. To make the insertion of the polymeric plug 10 into the threaded bore of the nut easier, the polymeric plug 10 is preferably slightly conical, such that the leading end 11, which is the end first received in the nut threaded bore, has a slightly smaller diameter than the following end and the edges at the top and bottom surfaces are rounded. As will be further described in regard to FIG. 2, the maximum diameter of the polymeric plug or blocking member 10 in the free or normal state is slightly larger than the minor or crest diameter of the screw thread which receives the plug 10, such that the screw thread bites sufficiently into the side surfaces of the softer masking plug 10. The masking plug 10 can be mass produced by well known silicon rubber molding methods.

The most preferred embodiment of the polymeric masking plug 10 includes an axial cavity having a spherical head 12 and a cylindrical opening or inlet 14. The diameter of the inlet 14 is preferably reduced or less than the diameter of the spherical cavity head 12. As will be noted later in regard to FIG. 5, the objective of the cavity 12 is to adhere the polymeric plug 10 to a bolt or screw by engagement with a spherical tip on the bolt.

Figure 2:
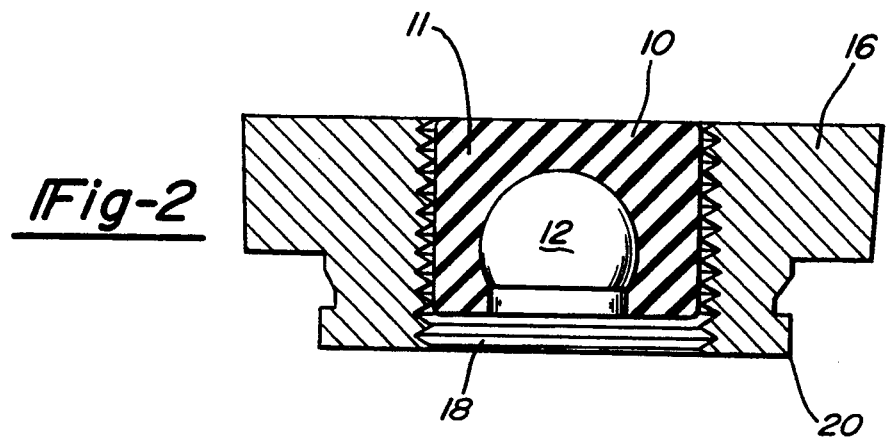
FIG. 2 is an enlarged side cross-sectional view in the axial direction illustrating the polymeric plug of FIG. 1 installed in a conventional pierce nut.

In the embodiment shown, the polymeric plug 10 is press fit into the screw hole 18 of pierce nut 16 as shown in FIG. 2. Pierce nut 16 is a conventional "universal" pierce nut having a threaded bore or screw hole 18 which extends in the axial direction and a shearing or piercing edge 20. As well known to those skilled in the art, pierce nut 16 can have any of several shapes, including square, round, hexagonal, etc. As will be further understood, the polymeric plug or blocking member 10 is compressed when press fit into the threaded bore 18 of pierce nut 16 and the threads 18 will then bite into the generally cylindrical side surface of the relatively soft polymeric plug 10. As shown in the drawings, when the pierce nut 16 is used as a nut for automotive parts, it is preferable to press fit blocking member 10 into screw hole 18 before feeding the pierce nuts into the feed mechanism of an automatic panel installation device. By doing so, it is possible to automate press fitting of the polymeric plugs or blocking members 10 in the nuts. In the case of weld nuts (not shown), it is similarly preferable to press fit the blocking members in the weld nuts before disposing the weld nuts in the nut feed magazine of the weld nut automatic welder.

Figure 3:
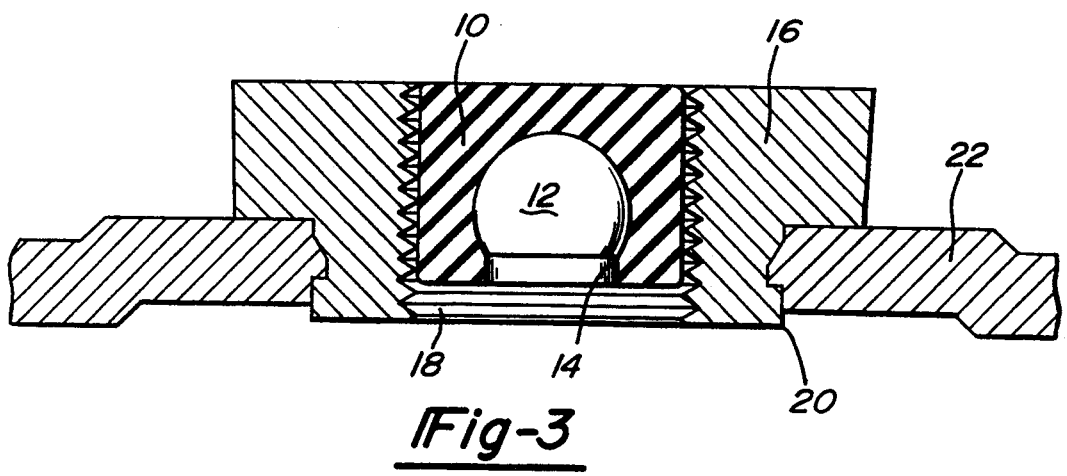
FIG. 3 is an enlarged cross-sectional view in the axial direction showing a pierce nut with a polymeric plug attached to a sheet metal part with only a portion of the sheet metal part being show.

Pierce nut 16 is thus press fit beforehand with blocking member or polymeric plug 10 in screw hole 18. The nut is then driven into sheet metal part 22, which may be manufactured beforehand by press processing as shown in FIG. 3. Alternatively, the panel may be simultaneously formed with the installation of the pierce nut. The installation of the pierce nut 16 in panel 22 can then be formed by a conventional type of press provided with a pierce nut installation head and die button. During installation, sheet metal 22 is perforated or pierced by shearing edge 20 of the pierce nut 16 and the pierce nut 16 is attached to sheet metal part 22 by methods well known to those skilled in the art. In the case of a weld nut (not shown), the weld nut is welded to the sheet metal part 22 by well known resistance or projection welding processes. Sheet metal part 22 can, for example, be an automotive floor panel, cross member, door, pillar, hood, trunk lid, dashboard, bumper reinforcement, side sil, bracket or any automotive or non-automotive metal part.

Figure 4:
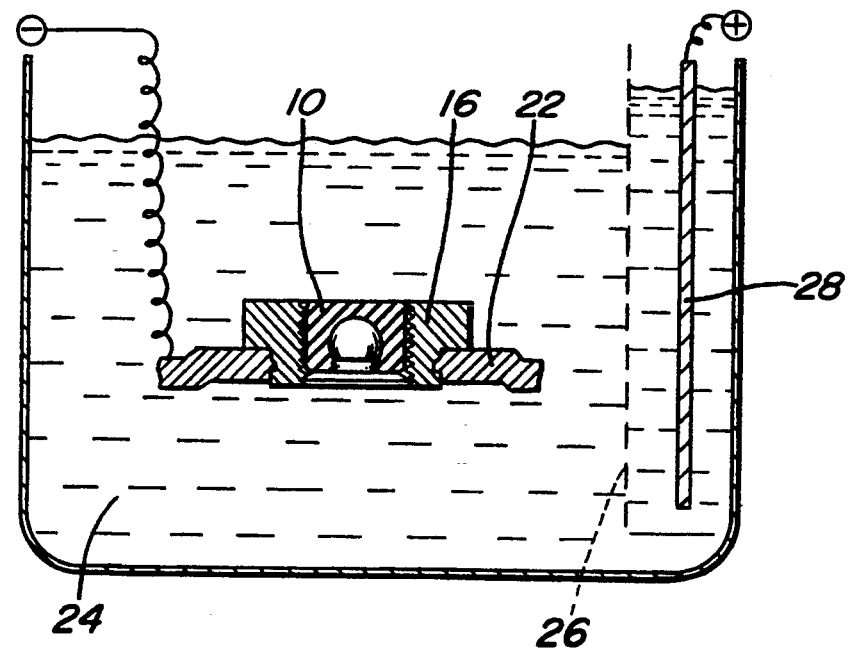
FIG. 4 illustrates schematically the coating of a nut and panel assembly by electrodeposition.

Sheet metal part 22 with the attached pierce nut 16 may then be painted or coated by electrodeposition coating as shown, for example, in FIG. 4. Specifically, sheet metal part 22 with nut 16 is immersed in electrodeposition bath 24. A positive voltage is applied to the electrode 28 separated by a partition film 26 and a negative voltage is applied to sheet metal part 22. Coating particles in the electrodeposition bath are electrodeposited evenly on the exposed surfaces of the nut 16 and sheet metal part 22 in the electrodeposition bath, but threaded bore 18 of the nut is materially blocked by the polymeric plug or blocking member 10, such that very little coating material adheres on the surfaces of the thread 18. In the preferred embodiment, the polymeric plug is formed of an electrically insulating material and thus does not electrically draw the coating particles, such that coating material is not deposited on the inside of the axial cavity 12. When the electrodeposition coating is completed, the surfaces are washed with water and dewatered by compressed air by conventional methods. The coating is then baked with the polymeric plug in place. A polymeric plug 10 formed of silicon rubber in the bulk state has superior heat resistance, such that it can bear baking temperatures of 180° to 200° C. without melting or decomposing. Thus, the plug will not be lost or shrink during the baking process.

The sheet metal part 22 with the nut 16 attached can be further coated with a middle coating and a top coating after undercoating by electrodeposition. The polymeric plug or blocking member 10 remains in place in threaded bore 18 of the nut during these initial coating processes, masking and protecting the screw threads. Where the threaded bore is not used to attach the panel assembly to a structural member or accessory, the polymeric plug continues to serve as a seal for the nut and panel assembly, preventing the infiltration of foreign particles and noise and the generation of noise by wind.

Figure 5:
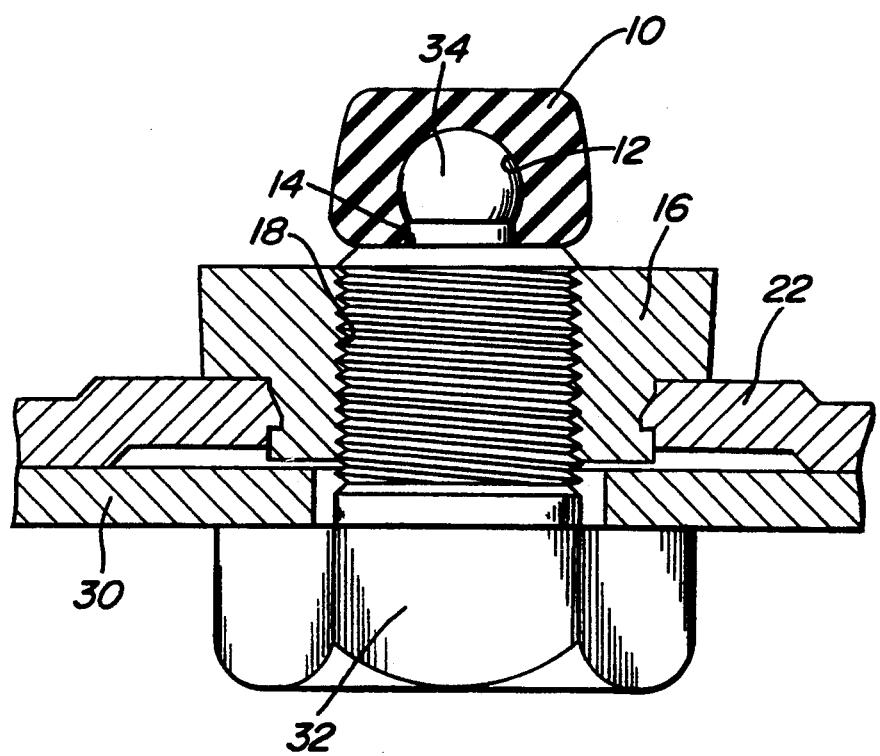
FIG. 5 is an enlarged cross-sectional view in the axial direction illustrating the nut and panel assembly of FIG. 3 attached to an accessory or structural member with the preferred embodiment of the screw or bolt of this invention.

When attaching an element to the nut and panel assembly, such as accessory 30, etc., it is preferable to use the especially designed bolt 32 shown in FIG. 5. In the disclosed embodiment, the bolt 32 includes an axial spherical protrusion 34 on the leading end or tip of the bolt 32. This protrusion 34 is received in the cavity 12 of the polymeric plug 10 as the bolt is threaded into the threaded bore 18 of the nut. When the bolt 32 is inserted into the threaded bore 18 of the nut to fasten accessory 30 to the sheet metal part 22, the protrusion 34 at the tip of the bolt is guided into inlet 14 of the axial cavity, even if the threaded bore if fully closed by blocking member 10. The spherical protrusion 34 is thus inserted into the spherical head 12 of the cavity with the tightening of the bolt. When the bolt is threaded further, the polymeric plug or blocking member 10 is gradually pushed out of the threaded bore 18 by the bolt. When the bolt is fully threaded into the threaded bore 18, the polymeric plug 10 is pushed out of the nut bore, but is retained on the tip 34 of the bolt 32 as shown in FIG. 5. The polymeric plug 10 does not fall off the bolt 32, even with the generation of vibration during normal travel of the vehicle because of the elasticity of the silicon rubber material.

As will be understood by those skilled in the art, various modifications may be made to the nut and panel assembly of this invention, including the polymeric plug or blocking member 10 and the method of this invention, within the purview of the appended claims. For example, the invention can be applied to electrostatic coatings, for example, as well as electrodeposition coatings. Further, the nut and panel assembly and method of this invention are not limited to pierce or clinch nuts, but may also be used with weld nuts and other types of nuts which are affixed to a panel. Finally, the nut and panel assembly and method of this invention is not limited to automotive applications, but may be used in many other applications, but the method of this invention is particularly, but not exclusively adapted for mass production applications.

As will now be understood, the nut and panel assembly and method of this invention eliminates the requirement for manual masking of nut threads during subsequent coating processes, such as electrodeposition coating, etc. Thus, the cost of the sheet metal parts with nuts for mass production applications can be reduced considerably.

From another viewpoint, the blocking member is elastically held in the threaded bore of the nut and masks or blocks the threaded bore, such that the sheet metal part manufactured by the above-described invention does not generate noise by the wind, even when the nut is left unused, and the polymeric plug prevents foreign matter, mud, and engine noise from infiltrating into the vehicle. When the polymeric plug is formed from silicon rubber, which has superior heat resistance and elasticity, the polymeric plug can bear high heat welding temperatures and film coating baking temperatures, such that the invention can be applied to sheet metal parts having weld, pierce and clinch nuts. Further, even if the polymeric plug drops into a space in the vehicle, it does not generate abnormal noise or rust.

By providing a spherical protrusion at the tip of the bolt and providing a spherical cavity in the polymeric plug, it is possible to prevent the polymeric plug from coming loose during bolt installation and protects the tip of the bolt. Thus, the nut and panel assembly and method of this invention provides several important advantages over the known prior art.

We claim:

1. A nut and metal panel assembly, said nut attached to said panel and having a threaded bore extending therethrough, a resilient non-metallic plug located in said bore having a normal outside diameter greater than a minor crest diameter of said threaded bore and retained in said threaded bore by said thread, said plug being slightly conical having a smaller diameter at one end which is first received in said nut bore and an axial length generally equal to an axial length of said threaded bore and masking said threaded bore during subsequent coating of said nut and panel assembly.

2. The nut and panel assembly defined in claim 1, characterized in that said plug is formed of an electrically insulating, heat resistant elastic polymer.

3. The nut and panel assembly defined in claim 2, characterized in that said plug is formed of a silicon rubber polymer.

4. The nut and panel assembly defined in claim 1, characterized in that said resilient plug is generally cylindrical having rounded top and bottom edges and having an axial length slightly less than an axial length of said threaded bore.

5. The nut and panel assembly defined in claim 1, characterized in that said resilient plug has a configured axial cavity opening through one end of said plug for receipt of a male member which removes and retains said plug.

6. The nut and panel assembly defined in claim 5, characterized in that said opening to said cavity has a diameter less than a diameter of said cavity, defining a restricted axial opening.

7. The nut and panel assembly defined in claim 5, characterized in that said cavity is generally spherical and said opening is generally cylindrical, said cylindrical opening having a diameter less than said spherical cavity.

8. A nut and metal panel assembly, said nut permanently attached to said panel adjacent its periphery and said nut having an axial threaded bore therethrough, a generally cylindrical resilient, heat resistant and electrically insulating polymeric plug located in said bore, said plug having a normal outside diameter greater than a crest diameter of said threaded bore and said threaded bore resiliently and releaseably retaining said plug in said bore and said polymeric plug having an axial length generally equal to an axial length of said bore, said plug masking said threaded bore during subsequent coating of said nut and panel assembly.

9. The nut and panel assembly defined in claim 8, characterized in that said polymeric plug is formed of a silicon rubber polymer.

10. The nut and panel assembly defined in claim 8, characterized in that said plug is slightly conical having a smaller diameter at one end and having an axial length slightly less than an axial length of said bore.

11. The nut and panel assembly defined in claim 8, characterized in that said resilient plug has a configured axial cavity opening through one end of said polymeric plug for receipt of a male member which removes and retains said plug.

12. The nut and panel assembly defined in claim 11, characterized in that said opening has a diameter less than a diameter of said cavity defining a restricted axial opening through said one end of said plug.

13. The nut and panel assembly defined in claim 12, characterized in that said cavity is generally spherical and said opening is generally cylindrical, said cylindrical opening having a diameter less than said spherical cavity.

14. A fastener and panel assembly, said fastener permanently attached to said panel and having a female threaded bore, a plastic plug located within said bore having a generally cylindrical exterior surface deformed into the threads of said female threaded bore forming an interference fit between said exterior surface and said threads releasably retaining said plug in said bore and sealing said bore, and said plastic plug having a generally axial cavity opening through one end of said plug.

15. The fastener and panel assembly defined in claim 14, characterized in that said plug is formed of an electrically insulating, heat resistant polymer.

16. The fastener and panel assembly defined in claim 14, characterized in that said axial cavity is generally spherical having a restricted opening.

17. The fastener and panel assembly defined in claim 14, characterized in that said plug is formed of a resilient silicon rubber polymer.

18. A method of forming a nut and panel assembly, said nut having an axial threaded bore therethrough having a resilient polymeric plug therein, said plug having a normal outside diameter greater than an inside crest diameter of said threaded bore, said method comprising the following steps performed in sequence:

(a) inserting and press fitting said polymeric plug, said plug having an axial length generally equal to an axial length of said threaded bore and masking said threaded bore;

(b) permanently attaching said nut to said panel, forming said nut and panel assembly; and (c) coating said nut and panel assembly, said plug masking said threaded bore during said coating step.

19. The method of forming a nut and panel assembly defined in claim 18, wherein said method further includes removing said polymeric plug following coating of said nut and panel assembly.

20. The method of forming a nut and panel assembly defined in claim 19, wherein said polymeric plug has an axial configured cavity, said method including molding said polymeric plug including said axial configured cavity and removing said polymeric plug from said threaded bore by threading a bolt in said nut bore, said bolt having an end protrusion configured to be received in said plug axial cavity, including inserting said bolt protrusion into said plug cavity and continuing to thread said bolt into said nut bore, said bolt removing said plug from said nut bore said bolt protrusion retaining said plug following removal of said plug from said bore.

21. The method of forming a nut and panel assembly as defined in claim 18, wherein said polymeric plug is formed of an electrically insulating and heat resistant elastic polymer and said method including coating said nut and panel assembly by dipping said assembly in an electrodeposition paint tank and electrodepositing a coating on said nut and panel assembly, then removing said polymeric plug.

22. A method of forming a nut and metal panel assembly, said nut having an axial threaded bore therethrough, said method comprising the following steps, performed in sequence:

(a) molding a resilient generally cylindrical polymeric plug having an outside diameter slightly greater than an inside minor crest diameter of said threaded bore and having an axial configured cavity opening through one axial end of said plug;

(b) inserting and press fitting said polymeric plug in said nut threaded bore, said threaded bore releaseably retaining said plug;

(c) permanently attaching said nut to said panel and forming said nut and panel assembly; and (d) coating said nut and panel assembly, said plug masking said threaded bore during said coating step.

23. The method of forming a nut and panel assembly as defined in claim 22, wherein said polymeric plug is removed from said nut bore following coating of said nut and panel assembly.

24. The method of forming a nut and panel assembly as defined in claim 23, wherein said plug is removed by threading a bolt into said nut bore, said bolt having generally spherical end protrusion configured to be received in said plug axial cavity, said bolt protrusion inserted into said axial cavity as said bolt is threaded into said threaded bore, and said method including continuing to thread said bolt into said nut bore, removing said plug from said nut bore and said bolt protrusion retaining said plug following removal of said plug from said nut bore.

25. The method of forming a nut and panel assembly as defined in claim 22, wherein said polymeric plug is formed of a heat resistant and electrically insulating elastic polymer, said method including coating said nut and panel assembly by immersing said nut and panel assembly in an electrodeposition paint tank, including electrically depositing a paint on said nut and panel assembly, then removing said polymeric plug.

* * * * *